United States Patent [19]

Batteux et al.

[11] 4,384,875

[45] May 24, 1983

[54] PROCESS AND INSTALLATION FOR REGENERATING AN ABSORBENT SOLUTION CONTAINING GASEOUS COMPOUNDS

[75] Inventors: Jacques Batteux, Serres Morlaas; Alain Godard, Mourenx, both of France

[73] Assignee: Societe Nationale Elf Aquitaine, Paris, France

[21] Appl. No.: 249,480

[22] Filed: Mar. 31, 1981

[30] Foreign Application Priority Data

Mar. 31, 1980 [FR] France ............................... 80 07210

[51] Int. Cl.$^3$ ................................................. F25J 3/02
[52] U.S. Cl. ........................................... 62/17; 62/28; 62/26; 55/68; 48/196 R
[58] Field of Search ................... 62/17, 26, 29, 27, 28; 55/68, 73; 48/196 R

[56] References Cited

U.S. PATENT DOCUMENTS

| | | | |
|---|---|---|---|
| 4,088,735 | 5/1978 | Bratzler | 55/73 |
| 4,097,250 | 6/1978 | Pagani et al. | 55/73 |
| 4,250,150 | 2/1981 | Karwat et al. | 55/73 |
| 4,284,423 | 8/1981 | Eakman et al. | 62/26 |
| 4,305,733 | 12/1981 | Scholz et al. | 62/24 |
| 4,311,496 | 1/1982 | Fabian | 62/17 |

*Primary Examiner*—Norman Yudkoff
*Attorney, Agent, or Firm*—Burgess, Ryan and Wayne

[57] ABSTRACT

The present invention relates to a process for regenerating an absorbent solution, for example an aqueous solution of an alkanolamine, containing acid compounds such as $CO_2$ and/or $H_2S$, in which said compounds are released by heating and/or stripped away. The regenerated absorbent solution, drawn off from the regeneration zone, is subject to a plurality of successive expansions with formation of a vapor in the course of each expansion, and the vapor thus formed is gradually compressed to form a compressed vapor, which is introduced into the regeneration zone. Such a process of regeneration with expansion of the regenerated solution is used in the regenerative processes for scrubbing gases containing acid compounds and renders possible an appreciable overall saving of energy.

12 Claims, 1 Drawing Figure

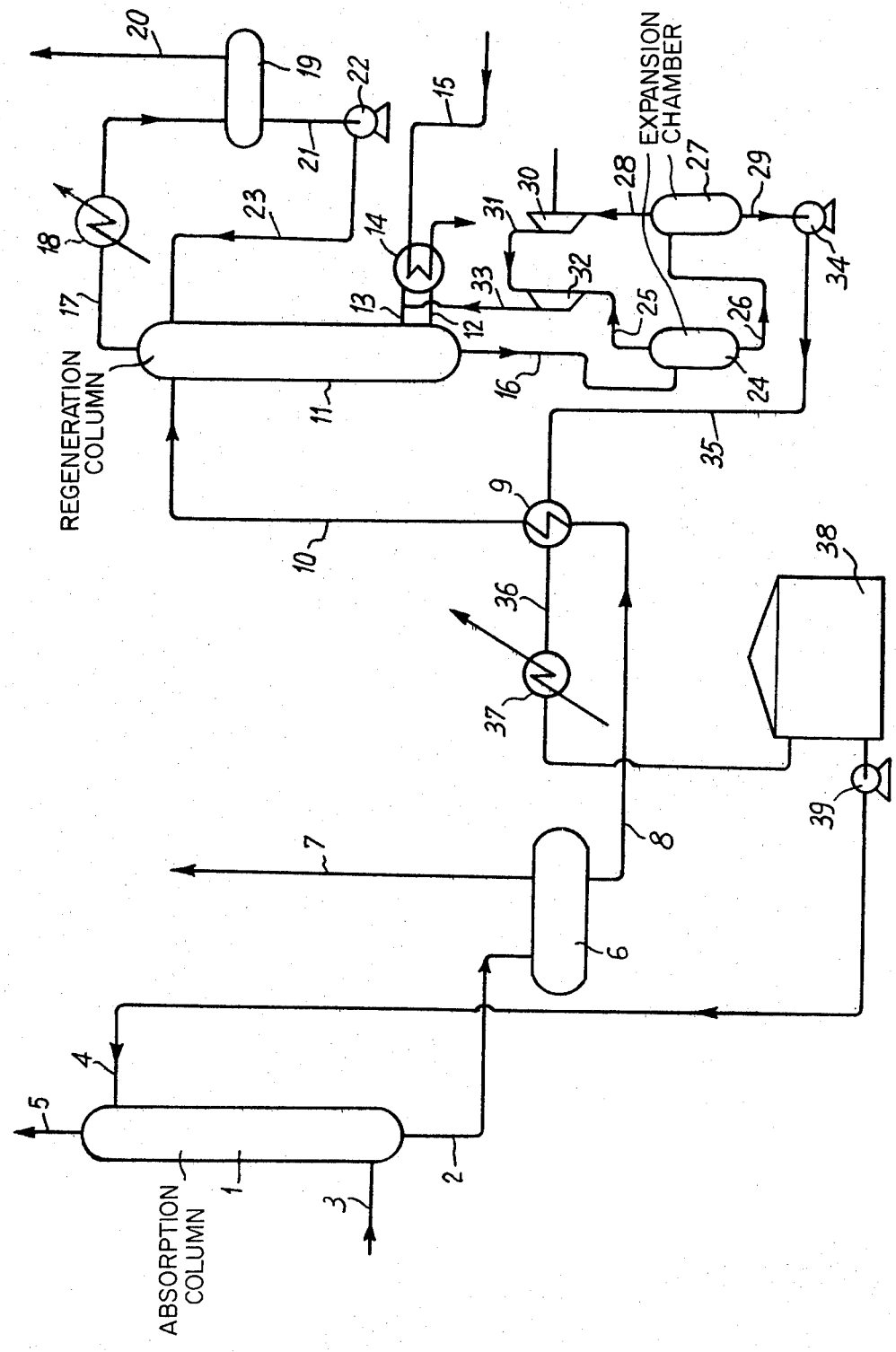

PROCESS AND INSTALLATION FOR REGENERATING AN ABSORBENT SOLUTION CONTAINING GASEOUS COMPOUNDS

BACKGROUND OF THE INVENTION

The invention relates to a process for regenerating an absorbent solution containing one or more normally gaseous compounds capable of being released by heating and/or stripping. It relates in particular to the regeneration of an absorbent solution, and in particular an absorbent aqueous solution containing acid gaseous compounds such as $H_2S$ and/or $CO_2$, said solution coming for example from a stage of absorption in the course of which the absorbent solution, which is fresh or which has just been subjected to a regeneration, is placed in contact with a gas containing one or more acid compounds such as $H_2S$ and $CO_2$. It also relates to an installation for carrying out said process.

The acid compounds, particularly $H_2S$ and/or $CO_2$ contained in gases are generally eliminated by scrubbing said gases with an absorbent solution which retains the acid compounds by simple physical dissolution or-/and by dissolution after formation of a salt or of a thermally unstable complex, by reaction of said acid compounds with a basic compound present in the absorbent solution. In practice, the gas to be treated, containing the acid compounds to be eliminated, is placed in contact, in an absorption zone, with the chosen absorbent under conditions of pressure and temperature such that the absorbent solution fixes virtually all the acid compounds. The purified gas emerges at the top of the absorption zone and, if necessary, it is then directed towards a scrubber employing sodium hydroxide, in which the last traces of acid compounds are removed. At the bottom of the absorption zone, the absorbent solution containing acid compounds is drawn off and subjected to a regeneration treatment, i.e. to free it of the fixed acid compounds and thus restore its absorbent power vis-à-vis said acid compounds. To effect this regeneration, the absorbent solution to be regenerated, i.e. the laden absorbent solution drawn off from the absorption zone, is introduced into the upper half of a regeneration zone and the absorbent solution to be regenerated is maintained at its boiling point under pressure in this zone. The heat necessary for maintaining the boiling is furnished by reboiling the absorbent solution contained in the regeneration zone, i.e. by indirect heat exchange between part of the solution to be regenerated located in the lower half of the regeneration zone and a hot fluid at appropriate temperature, generally saturated water vapour. In the course of regeneration, the acid compounds contained in the absorbent solution to be regenerated maintained at its boiling point are released and stripped by the vapors of the absorbent solution. Said acid gaseous compounds emerge at the top of the regeneration zone and are passed through a condenser system which returns to the regeneration zone the liquid phase resulting from the condensation of the vapors of the absorbent solution which pass out of the regeneration zone with the gaseous acid compounds. At the bottom of the regeneration zone, the hot regenerated absorbent solution is drawn off and said regenerated solution is recycled to the absorption zone after having used part of the heat content of said solution to heat, by indirect heat exchange, the solution to be regenerated, before its introduction into the regeneration zone.

The indirect heat exchange between the absorbent solution to be regenerated and the hot regenerated solution makes it possible to recover part of the sensible heat of this latter solution, but the energy saving resulting from such a recovery is not consistent. In fact, a considerable part of the energy recovered in the course of said indirect heat exchange serves to vaporize a fraction of the absorbent solution to be regenerated, which emerges directly at the top of the regeneration zone with the acid gaseous compounds released when the reheated solution to be regenerated is introduced into the regeneration zone. Consequently, said vaporized fraction does not participate in the stripping of the acid gaseous compounds in the regeneration zone, but it requires a consumption of cooling fluid for condensation thereof in the condenser system through which the released acid compounds pass. Moreover, the indirect heat exchange between the hot regenerated absorbent solution and the absorbent solution to be regenerated makes it possible to recover only a relatively small part of the sensible heat of the hot regenerated absorbent solution. It is necessary, after this heat exchange, to subject the regenerated absorbent solution to a subsequent indirect cooling by means of a cold fluid such as for example water, to take it to the appropriate temperature for contact, in the absorption zone, with the gas to be purified containing the acid compounds to be eliminated. This additional stage of indirect cooling also consumes an appreciable quantity of cooling fluid.

U.S. Pat. No. 3,823,222 concerns a process for separation of $CO_2$ and $H_2S$ gases contained in hot gases also containing steam. Said gases are scrubbed with the aid of an alkaline absorbent solution, particularly an aqueous solution of potassium carbonate, in an absorption zone to fix the acid compounds. The alkaline absorbent solution containing the acid compounds is regenerated by steam-stripping in a regeneration zone in which the solution in the course of regeneration is heated by reboiling with steam. The regenerated absorbent solution is recycled to the absorption zone. A process has been proposed to improve recovery of the sensible heat contained on the one hand in the gases to be purified of their acid gas content and on the other hand in the regenerated absorbent solution at the regeneration phase. In the process, the hot gases to be purified first pass in indirect heat exchange with boiling water, with production of a first stream of steam under pressure and partial cooling of said gases. The partially cooled gases are then brought into indirect heat exchange with a part of the absorbent solution contained in the lower half of the regeneration zone, with production of a second stream of steam having a lower pressure than that of the first stream and further cooling of the gases to be purified. The gases having undergone this further cooling are then directed towards the absorption zone whilst the second stream of steam is introduced into the regeneration zone as stripping steam. Finally, the regenerated absorbent solution drawn off from the regeneration zone is directed to an expansion zone maintained under reduced pressure by a steam ejector, so as to form a certain quantity of steam under said reduced pressure and to partially cool the regenerated absorbent solution. Said partially cooled solution is then directed to the absorption zone after supplementary cooling to take it to the appropriate temperature for contact thereof with the gases to be purified. The first stream of steam under pressure is used as motive steam in the steam ejector to reduce the pressure in the expansion zone and compress the steam under reduced pressure formed in this zone, and the mixture of motive steam and of steam issuing from expansion, which leaves the ejector at a pressure close to the pressure at the bottom of the regeneration zone, is introduced into said zone as additional stripping steam.

Although it improves heat recovery, such a process presents certain drawbacks. Firstly, it is applied to gases to be purified, of which the temperature is relatively high, for example 150° to 200° C., which is not the general case. The use of a steam ejector to maintain the expansion zone under reduced pressure and to compress the steam formed in the expansion zone then requires, for driving this ejector, a quantity of motive steam greater than the quantity of steam produced in the course of expansion of the regenerated absorbent solution, this obliging, in the case of the motive steam not being produced directly by cooling of the gas to be purified, a source of steam to be provided in addition to the source of water vapor used for reboiling the absorbent solution in the course of regeneration. Finally, the quantity of motive steam used for operating the ejector must be permanently eliminated from the regeneration zone to maintain the water balance of the absorbent solution. This excess water vapor gives, after condensation, water polluted by the acid gases, and particularly by $H_2S$, whose disposal raises problems.

The invention is a process for regenerating an absorbent solution containing one or more normally gaseous compounds, particularly $H_2S$ and $CO_2$, capable of being released by reboiling of the absorbent solution. In the process an expansion of the regenerated absorbent solution is effected with formation of a vapor phase which is reinjected into the regeneration zone. The regeneration process is generally applicable and overcomes the drawbacks of the prior art process mentioned hereinabove which uses an expansion of the regenerated absorbent solution.

In a process for scrubbing gases containing acid gaseous compounds such as $H_2S$ and/or $CO_2$ and comprising a stage of absorption in the course of which the gas to be purified is scrubbed by an absorbent solution retaining the acid gaseous compounds, a stage for regeneration of the absorbent solution containing the acid compounds, and a recycling of the regenerated absorbent solution to the absorption stage, the regeneration as proposed by the invention makes it possible to make an overall saving of energy which is appreciable with respect to regeneration carried out in conventional manner or according to the technique employing a steam ejector as taught by the U.S. Patent mentioned hereinabove.

The process according to the invention for the regeneration of an absorbent solution containing one or more normally gaseous compounds which are capable of being released by heating and/or stripping, is of the type in which the solution to be regenerated is injecting into a regeneration zone, the solution to be regenerated is maintained in said zone under conditions ensuring an absolute pressure at the bottom of the zone greater than 1.2 bars and preferably between 1.3 and 5 bars, and allowing a release and/or a stripping of the absorbed gaseous compounds, the released gaseous compounds are removed at the top of the regeneration zone and the regenerated solution is drawn off at the bottom of said zone. A series of operations is carried out on the drawn off regenerated solution comprising reducing the pressure of the regenerated solution with release of a vapor, compressing the released vapor to a pressure substantially equal to the pressure at the bottom of the regeneration zone, and introducing the compressed vapor obtained into the lower half of the regeneration zone. The process is characterised in that the rate of flow pertaining to mass of the recompressed vapor introduced into the lower half of the regeneration zone is substantially equal to the rate of flow pertaining to mass of the vapor released in the course of the reduction in the pressure of the regenerated solution drawn off from the regeneration zone.

The expansion or reduction of pressure of the regenerated absorbent solution is advantageously effected in a plurality of successive expansion stages. The stages comprise an initial stage, optionally one or more intermediate stages and a final stage. The compressed vapor, which is introduced into the lower half of the regeneration zone, is formed by gradual recompression of the vapor released in the course of the successive expansion stages. The vapor released in the course of any expansion stage following the initial expansion stage is compressed to at a pressure substantially equal to the pressure of the vapor released in the course of the expansion stage immediately preceding said expansion stage following the initial expansion stage, this recompression being effected either only on the vapor released in the course of the expansion stage following the initial expansion stage, if it is the final stage, or on a vapor obtained by combination, during said compression, of the vapor released in the course of said expansion stage following the initial expansion stage and of the vpaor of substantially equal pressure formed by gradually compressing the vapor released in the course of the expansion stages, following the expansion stage following the initial expansion stage, and the vapor phase released in the course of the initial expansion stage is combined with the vapor of substantially equal pressure constituted from all the vapor released in the course of the expansion stages following the initial expansion stage and the whole compressed to a pressure substantially equal to the pressure at the bottom of the regeneration zone, each recompression being effected with conservation of the rate of flow pertaining to mass between recompressed fluid and fluid to be compressed.

In particular, the expansion of the regenerated solution drawn off from the regeneration zone is effected in n successive expansion stages, namely an initial stages, (n-2) intermediate stages, and a final stage, n being a whole number of from 2 to 4.

In a preferred embodiment of the process of regeneration according to the invention, the expansion of the regenerated solution, drawn off from the regeneration zone, is effected in two stages, the pressure of the vapor released in the final expansion stage is raised to a value substantially equal to that of the pressure of the vapor released in the course of the initial expansion stage, said phases of substantially equal pressures are combined and the whole is compressed to a pressure substantially equal to the pressure at the bottom of the regeneration zone. The compressed vapor is introduced into the lower half of the regeneration zone. In the present invention each recompression is effected so that the rate of flow pertaining to mass of the fluid to be compressed is substantially equal to the rate of flow pertaining to mass of the compressed fluid resulting from this recompression.

The pressure of the vapour phase released in the course of the final expansion stage may reach values which, depending on the case, may be close to atmospheric pressure or even much lower than atmospheric pressure. Expansion of the regenerated absorbent solution, drawn off from the regeneration zone, is advantageously effected so that the pressure of the vapour phase released in the course of the final expansion stage has a value ranging from 0.5 to 2 bars absolute, this pressure being, of course, lower than the pressure at the bottom of the regeneration zone.

In the course of the successive expansion stages, the drop in pressure for each expansion stage can vary from one expansion stage to the other or may comprise a substantially constant value.

In the regeneration zone, the release and stripping away of the gaseous compounds absorbed by the absorbent solution to be regenerated may be effected by addition, to the solution to be regenerated contained in said zone, of the calories necessary for the release of the absorbed gaseous compounds and for the production, from this solution, of a gaseous stripping fluid. The absorbed gaseous compounds may also be released and stripped solely by injection of a gaseous stripping fluid in the regeneration zone, or by combining a heating of the solution to be regenerated with an injection of a gaseous stripping fluid.

The absorbent solution to be regenerated containing one or more gaseous compounds capable of being released by heating said solution and/or stripped from this solution, is in particular an absorbent solution which contains acid compounds such as $CO_2$, $H_2S$ and possibly COS.

Such an absorbent solution containing acid compounds is for example obtained, during the scrubbing of various gases, particularly natural gas, containing one or more acid gaseous compounds such as $CO_2$, $H_2S$, COS, by bringing the gas to be purified into contact with the absorbent solution chosen by operating under appropriate conditions of pressure and temperature, for example under absolute pressures ranging from 1 to 120 bars and at temperatures of the order of 30 to 110° C.

The absorbent solution used for fixing the absorbable gaseous compounds and in particular the acid gaseous compounds such as $CO_2$, $H_2S$, COS, may be any one of the absorbent solutions known in the art to this end. This absorbent solution may in particular be constituted by a solvent of organic type, for example phosphoric ester or sulfolane, possibly containing additives such as amines. The absorbent solution comprises, most often, an aqueous solution of a basic compound which fixes the acid compounds to be absorbed, particularly CO and $H_2S$, in the form of complexes decomposable by heating. The basic aqueous solution being for example an aqueous solution of potassium phosphate or potassium carbonate, an aqueous solution of an aminoacid such as glycine, and in particular an aqueous solution of a primary, secondary or tertiary alkanolamine such as in particular monoethanolamine, diethanolamine, triethanolamine, methyldiethanolamine, diisopropanolamine.

In particular, the absorbent solution to be regenerated which is introduced into the top half of the regeneration zone, comes from an absorption zone in which a gas, for example natural gas, containing absorbable compounds, and in particular one or more acid gaseous compounds such as $CO_2$, $H_2S$, COS, is scrubbed. The gas stream is preferably scrubbed counter currently by the regenerated absorbent solution issuing from the final expansion stage following the regeneration. The expanded regenerated solution being used, before being injected into the absorption zone, to reheat, by indirect exchange, the absorbant solution to be regenerated.

An installation for regeneration, according to the invention, of an absorbent solution containing one or more normally gaseous compounds capable of being released by heating and/or stripped away, comprises a regeneration column associated with a system for heating and/or injecting a stripping gas, said column being further provided with a draw-off conduit at the bottom of the column for the regenerated solution, a conduit for supplying a compressed vapor opening in its lower half, a conduit for supplying the solution to be regenerated, and with a conduit for removing the gases at the top of the column. The installation also includes, an assembly for expansion of the regenerated solution. The assembly for the expansion of the regenerated solution comprises an inlet connected to the draw-off conduit of the regeneration column and an outlet for the expanded regenerated solution constituting the outlet of the regeneration installation for the regenerated absorbent solution. The expansion assembly produces a vapor, and utilizes apparatus for compressing the vapor and for introducing the compressed vapor into the regeneration column. The expansion assembly comprises a plurality of expansion chambers each comprising an inlet and an outlet for the regenerated absorbent solution and an outlet for a vapor. The expansion chambers being connected in series so that the inlet of the first chamber of the series is connected to the draw-off conduit of the regeneration column. The inlet of each of the following chambers is connected to the outlet for the regenerated solution of the chamber immediately upstream, the outlet for the regenerated solution of the expansion chamber most downstream of the regeneration column constituting the outlet of the expansion assembly. The compression assembly comprises in a plurality of compressor stages of the type with conservation of the rate of flow pertaining to mass between fluid to be compressed and compressed fluid, each compressor stage being associated with an expansion chamber. The compressor stages are disposed in series so that each compressor stage has its suction connected to the outlet for the vapor of the corresponding expansion chamber and its outlet connected to the suction of the compressor stage corresponding to the expansion chamber located immediately upstream. The outlet of the compressor stage associated with the expansion chamber connected to the bottom of the regeneration column being connected to the conduit for conducting the compressed vapor to the regeneration column, thus constituting the vapor outlet of the recompression assembly.

As indicated above, the expansion assembly according to the invention comprises a plurality of expansion chambers, i.e. an initial expansion chamber, possibly one or more intermediate expansion chambers, and a final expansion chamber. The associated recompression assembly contains the same number of compressor stages, each compressor stage comprising one or more compressors. In particular, the installation contains n expansion chambers and n compressor stages associated therewith, n being a whole number of from 2 to 4.

The plurality of compressor stages can comprise by mechanical compressors driven independently or mounted on the same drive shaft, said compressors being, for example, centrifugal compressors, axial compressors, or rotary volumetric compressors.

The regeneration installation according to the invention may advantageously be substituted for the conventional regeneration installation of a process for purifying gases containing absorbable gaseous compounds. The process is particularly useful for removing acid gaseous compounds such as $CO_2$, $H_2S$ and COS, by scrubbing the gases with an appropriate absorbent solution. The scrubbing installations comprising, as is well known, an absorption column associated with a regeneration column. The regeneration installation according to the invention is associated with the conventional absorption column. The outlet for the expanded regenerated absorbent solution of the expansion chamber most downstream of the regeneration column, is connected, through one of the two fluid circulation circuits of an indirect heat exchanger, to one or more absorbent inlets of the absorption column. The outlet for the solution to be regenerated, containing absorbed gaseous compounds, located at the bottom of the absorption column is connected, through the other fluid circulation circuit of said heat exchanger, to the conduit supplying solution to be regenerated, provided on the regeneration column.

The absorption and regeneration columns of the above installations are for example columns with packing materials or columns with plates, as is well known in the art.

The invention will be more readily understood on reading the following description with reference to the accompanying drawings, in which:

The single FIGURE schematically shows an installation for purifying a gas containing $H_2S$ and $CO_2$ by scrubbing with the aid of an absorbent solution, said installation being equipped with a regeneration installation according to the invention in which two expansion chambers associated with two compressor stages are used.

Referring now to the drawing, the scrubbing installation comprises an absorption column 1 with plates provided with a conduit 2 for evacuation of the absorbent solution at the bottom of the column, a conduit 3 for supplying the gas to be purified in its lower half, a conduit 4 for supplying the regenerated absorbent solution in its upper half, and a conduit 5 for removal of the purified gas. The conduit 2 is connected to a degassing vessel 6 provided with a conduit 7 for outlet of the gases and a conduit 8 for outlet of liquid. The conduit 8 is connected to the inlet of one of the two fluid circuits of an indirect heat exchanger 9. The outlet of said circuit is connected to a conduit 10 which opens into the upper half of a regeneration column 11. The regeneration column 11 is associated, by inlet and outlet tubes 12 and 13 respectively, with a reboiler 14 heated by saturated water vapour circulating in a conduit 15. The column provided, in addition to the conduit 10, with a conduit 16 for drawing off liquid at the bottom of the column and with a conduit 17 for removal of gas at the top of the column. The conduit 17 is connected to a condenser system comprising a condenser 18 associated with a gas/liquid separator 19, said separator being provided with a gas removal pipe 20 at its upper part and with a conduit 21, for drawing off the condensate connected to the inlet of a pump 22. The outlet of pump 22 is connected by a pipe 23 which opens into the regeneration column 11 between the inlet point of conduit 10 and the outlet point of conduit 17. The draw-off conduit 16 is connected to the inlet of an expansion chamber 24 (initial expansion chamber) provided at the top with an outlet conduit 25 for the vapours and at the bottom with an outlet conduit 26 for liquid. A second expansion chamber 27 (final expansion chamber) has its inlet connected to the conduit 26 and possesses at the top an outlet conduit 28 for the vapours and at the bottom an outlet conduit 29 for liquid. A mechanical compressor 30, here an axial compressor, has its suction orifice connected to the conduit 28 and its delivery orifice connected, via a conduit 31, to the suction orifice of another compressor 32 of the same type. The suction orifice of the compressor 32 is also connected to the conduit 25 whilst the delivery orifice of said compressor 32 is connected by a conduit 33 to conduit 13 of the reboiler 14 of regeneration column 11. The liquid outlet conduit 29 of the final expansion chamber 27 is connected to the inlet of pump 34. The outlet of pump 34 is connected by conduit 35 to the inlet of the second fluid circuit of the indirect heat exchanger system 9. The outlet of said circuit is connected by conduit 36 through a cooler 37, to the inlet of a storage zone 38. The outlet of the storage zone 38 is connected, through pump 39 and conduit 4, to the absorption column.

This installation functions as follows:

The gas to be purified, for example a natural gas, containing the acid gaseous compounds $H_2S$ and $CO_2$ enters absorption column 1 through conduit 3, and contacts the absorbent solution which enters column 1 through conduit 4 and passes through the absorption column countercurrently with respect to the gas to be purified. The purified gas leaves at the top of absorption column 1 through conduit 5. At the bottom of the column, the absorbent solution containing absorbed acid compounds is drawn off through conduit 2. The laden absorbent solution which constitutes the absorbent solution to be regenerated, passes to the degassing vessel 6 in which a gaseous fraction, essentially containing hydrocarbons entrained in the absorbent solution, is separated, said fraction being removed through conduit 7. The degassed, laden absorbent solution is reheated and partially vaporized in the heat exchanger system 9 and passes through conduit 10 to the regeneration column 11, for example a column of the type with plates. In this column, the absorbent solution containing absorbed acid compounds is maintained at its boiling point under a pressure greater than atmospheric pressure (pressure at the bottom of the column greater than 1.2 bars, and preferably between 1.3 and 5 bars). The calories necessary for maintaining the absorbent solution to be regenerated at its boiling point and for the production of the stripping steam are furnished by passage of said solution through the reboiler 14 heated by saturated vapor from conduit 15. The acid gases which are released in the regeneration column on stripped by water vapor generated from the absorbent solution in the reboiler and removed through conduit 17 to the condenser system. In the condenser system, the gaseous phase is cooled in the condenser 18 then separated, in the separator 19, into a gaseous mixture comprising the acid gases $H_2S$ and $CO_2$, which is removed through conduit 20, and a condensed liquid phase (condensate) recycled in the regeneration column, via the conduit 21, the pump 22 and the conduit 23. The regenerated absorbent solution is drawn off through the conduit 16 and passed to the initial expansion chamber 24. In this chamber, the pressure of the regenerated absorbent solution is reduced sharply resulting in the formation of a vapor phase, comprising essentially water vapour, and a cooled regenerated absorbent solution. The regenerated absorbent solution expanded in the initial expansion chamber 24 then passes to the final expansion chamber 27, in which the pressure of the absorbent solution undergoes another sudden reduction resulting in formation of a new vapor phase comprising essentially water vapor, of which the pressure is lower than that of the vapor phase formed in the initial expansion chamber, and a further cooling of the regenerated absorbent solution. The vapor phase issuing from the expansion chamber 27 is recompressed, by the compressor 30, to a pressure equal to that of the vapor phase issuing from the expansion chamber 24, and the vapor phases, of the same pressure, coming from the compressor 30 and the expansion chamber 24, are combined in the compressor 32. In this compressor, all of said vapor is recompressed to at least the pressure at the bottom of the regeneration column and the resulting recompressed vapor is added, through conduit 33, to the water vapor generated in the reboiler 14 and passing to the regeneration column through conduit 13. The expanded regenerated absorbent solution leaving the final expansion chamber 27, which has been lost a quantity of water corresponding to the quantity of water vapor produced in the expansion chambers in the course of the two successive expansions and has cooled in the course of said expansions, passes, to the heat exchanger 9, in indirect heat exchange with the absorbent solution containing the absorbed acid compounds passing from the absorption zone through conduit 8 and heats said laden absorbent solution before the latter is introduced into the regeneration column through conduit 10. At the outlet of the heat exchanger 9, the regenerated absorbent solution passes to the cooler 37, in which it is cooled to the appropriate temperature for absorption. The cooled regenerated absorbent solution issuing from the cooler 37 is brought to the storage zone 38, from which it is directed, with a suitable rate of flow, towards the absorption zone via conduit 4.

The vaporization of water by the reduction of the pressure of the regenerated absorbent solution in the expansion chambers 24 and 27 contribute to cooling said absorbent solution. Moreover, each expansion stage constitutes a new stripping zone, which increases the theoretical number of plates of the regeneration column and consequently makes it possible to reduce the quantity of stripping gas. In addition, the recompressed water vapour produced by the compressors 30 and 32, from the water vapour vaporized in the expansion chambers, joins, in the regeneration column, the water vapour produced by reboiling the absorbent solution to be regenerated, and contributes substantially to the steam-stripping of the acid gases. Finally, the lowering of the temperature of the regenerated absorbent solution, which results from the vaporization of water in the expansion chambers, considerably reduces the consumption of cooler fluid of the cooler 37 and of the condenser system comprising the condenser 18, said cooling fluid generally being water.

To complete the foregoing description, an embodiment of the invention will be given hereinafter by way of the following non-limiting example.

EXAMPLE

In an installation similar to the one described with reference to the accompanying drawing, a natural gas containing $H_2S$ and $CO_2$ was purified by scrubbing with an absorbent solution comprising an aqueous solution of diethanolamine containing about 30% by weight of diethanolamine.

The natural gas to be purified contained, in volume, 15% of $H_2S$ and 10% of $CO_2$, the rest being hydrocarbons, including 69% of methane.

The main operational conditions used for this scrubbing are given hereinafter:

| Absorption: | |
|---|---|
| pressure. | 78 bars |
| temperature. | 85° C. |
| rate of flow of gas to be purified entering the absorption column. | $1.4 \cdot 10^5$ Nm³/h |
| rate of flow of the absorbent solution entering the absorption column. | 570 t/hour |
| Regeneration: | |
| pressure at the bottom of the column. | 2.5 bars |
| vapor consumed by reboiling. | 54 t/hour |
| reboiling temperature. | 129° C. |
| Expansion of the regenerated amine solution: | |
| pressure in the initial expansion chamber. | 1.6 bars |
| pressure in the final expansion chamber. | 1.05 bars |
| Cooling water consumed for the condenser 18-cooler 37 assembly: | 2100 m³/hour. |

By way of comparison, the above-mentioned natural gas was scrubbed with the same absorbent solution, operating in an installation differing from the one described in the accompanying Figure by the absence of the expansion chambers and the compressors, the draw-off conduit 16 at the bottom of the regeneration column then being directly connected to the heat exchanger system 9, such an installation being a conventional scrubbing installation.

The main operational conditions used for this comparative scrubbing giving the same quality of regenerated amine and the same characteristics of scrubbing as those obtained by the process according to the invention, are indicated hereinbelow:

| Absorption: | |
|---|---|
| pressure. | 78 bars |
| temperature. | 85° C. |
| rate of flow of the gas to be purified entering the absorption column. | $1.4 \cdot 10^5$ Nm³/h |
| rate of flow of the absorbent solution entering the absorption column. | 570 t/hour |
| Regeneration: | |
| pressure at the bottom of the column. | 2.5 bars |
| vapour consumed by reboiling. | 75 t/hour |
| reboiling temperature. | 129° C. |
| Cooling water consumed for the condenser 18-cooler 37 assembly: | 3380 m³/hour. |

By comparing the results obtained in the course of these tests, it appears that the regeneration as recommended by the invention makes it possible to make a saving of 21 t/hour (about 30%) on the regeneration vapour and a saving of 1280 m³/hour (about 38%) on the cooling water, compared with consumptions corresponding to conventional regeneration.

Deducting the energy consumed by the compressors, the process of regeneration with expansion of the regenerated absorbent solution according to the invention makes it possible to make an overall annual energy saving equal to about 5900 tonnes of oil equivalent.

The invention is, of course, not limited to the embodiment shown: numerous variants may be made thereto by the man skilled in the art without departing from the scope thereof. Thus, the connection between the delivery orifice of a compressor stage and the suction of the compressor stage corresponding to the expansion chamber located immediately upstream, which was made directly in the installation shown (direct connection through conduit 31 of the delivery orifice of the compressor 30 to the suction orifice of the compressor 32), may also be effected through said upstream expansion chamber (conduit 31 then connects the delivery orifice of the compressor 30 to the expansion chamber 24, the latter being connected via conduit 25 to the suction orifice of the compressor 32).

What is claimed is:

1. In a process for the regeneration of an absorbent solution containing 1 or 4 normally gaseous compounds capable of being released by heating or stripping, in which the solution to be regenerated is maintained in a regeneration zone under conditions ensuring an absolute pressure at the bottom of the zone greater than 1.2 bars, and allowing a release of the absorbed gaseous compounds, the released gaseous compounds are removed at the top of the regeneration zone and the regenerated solution is drawn off at the bottom of said zone, the improvement which comprises expanding the regenerated solution with release of a vapor, compressing the vapor to a pressure at least equal to the pressure at the bottom of the regeneration zone and introducing the compressed vapor into the lower half of the regeneration zone, said expansion regenerated solution and compression of the vapor formed being carried so that the rate of flow pertaining to the mass of compressed vapor introduced into the lower half of the regeneration zone, is substantially equal to the rate of the flow pertaining to the mass of the vapor released in the course of the expansion, of the regenerated solution drawn off from the regeneration zone wherein the expansion of the regenerated absorbent solution is effected in a plurality of successive expansion stages, comprising at least an initial stage and a final stage, and the compressed vapor, which is introduced into the lower half of the regeneration zone is formed by gradual compression of the vapor released in the course of the successive expansion stages, by compressing the vapor released in the course of any expansion stage following the initial expansion stage, to a pressure substantially equal to the pressure of the vapor released in the expansion stage immediately preceeding said expansion stage following the initial expansion stage, said compression being effected only on the vapor released in the course of the expansion stage following the initial expansion stage, if it is in the final stage or on a vapor obtained by combining, drawing said compression, the vapor released in the course of said expansion stage following the initial expansion stage and vapor of substantially equal pressure formed by compression of vapor released in the expansion stages following the expansion stage following the initial expansion stage, and the vapor released in the course of the initial expansion stage is combined with the vapor of substantially equal pressure comprising the vapor released in the course of the expansion stages following initial expansion stage and the whole taken to a pressure at least equal to the pressure at the bottom of the regeneration zone, each compression being effected with conservation of the rate of flow pertaining to the mass between compressed fluid and fluid to be compressed.

2. The process of claim 1 wherein the absolute pressure at the bottom of the regeneration zone is between 1.3 and 5 bars.

3. The process of claim 1 wherein the expansion of the regenerated absorbent solution is effected in n successive expansion stages comprising an initial stage, (n-2) intermediate stages and a final stage wherein n is a whole number of from 2–4.

4. The process of claim 3 wherein the expansion of the regenerated absorbent solution is effected in two stages, the pressure of the vapor released in the final expansion stage is raised to a value substantially equal to that of the pressure of the vapor released in the course of the initial expansion stage, the vapor of said stages having substantially equal pressures are combined and the whole is compressed to a pressure at least equal to the pressure at the bottom of the regeneration zone to form the compressed vapor which is introduced into the lower half of the regeneration zone, each compression being effected so that the rate of flow pertaining to mass of the fluid to be compressed and the rate of flow pertaining to mass of the fluid resulting from said compression are substantially equal.

5. The process of claim 1, 2, 3, or 4 wherein the absolute pressure of the vapor released in the course of the final expansion stage of the regenerated absorbent solution has a value ranging from 0.5 to 2 bars.

6. The process of claim 1, 2, 3 or 4 wherein the release and stripping of the gaseous compounds absorbed by the absorbent solution are effected either solely by injection of a gaseous stripping fluid into the regeneration zone, or by addition to the solution to be regenerated contained in said zone, of the heat necessary for release of the absorbed gaseous compounds and for the production from said solution of a gaseous stripping fluid, or by heating of the solution to be regenerated in combination with injection of a gaseous stripping fluid.

7. The process of claim 1, 2, 3 or 4 wherein the absorbent solution to be regenerated contains at least one of $H_2S$, $CO_2$ or COS capable of being released by heating or stripping.

8. The process of claim 7 wherein the absorbent solution comprises an aqueous solution of a basic compound which fixes the acid gaseous compounds $H_2S$, $CO_2$ and COS, said absorbent solution comprising an aqueous solution of an alkanolamine.

9. The process of claim 1, 2, 3 or 4 wherein the absorbent solution to be regenerated introduced in the regeneration zone comes from an absorption zone in which a gas to be purified containing absorbable and strippable compounds, comprising one or more acid gaseous compounds is scrubbed by the regenerated absorbent solution issuing from the final expansion stage following regeneration, said expansion regenerated solution being used, before being injected into the absorption zone, to re-heat, by indirect heat exchange, the absorbent solution to be regenerated issuing from the absorption zone before it is introduced into the regeneration zone.

10. In an installation for the regeneration of an absorbent solution containing one or more normally gaseous compounds capable of being released by heating or stripping of the type comprising, a regeneration column associated with a system for heating or injecting a stripping gas, said column being further provided with a draw-off conduit at the bottom of the column for the regenerated solution, a conduit for supplying a compressed vapor opening in its lower half, a conduit for supplying the solution to be regenerated, and a conduit for removing the gases at the top of the column and an assembly for expansion of the regenerated solution, comprising an inlet connected to the draw-off conduit of the regeneration column and an outlet for the expanded regenerated solution comprising the outlet of the regeneration installation for the regenerated absorbent solution, said expansion assembly producing a vapor and an assembly for compression of the vapor having an outlet connected to the conduit for supplying the compressed vapor provided on the regeneration column, the expansion assembly comprising a plurality of expansion chambers each having an inlet and an outlet for the regenerated absorbent solution and an outlet for a vapor, said chambers being connected in series so that the inlet of the first chamber of the series is connected to the draw-off conduit of the regeneration column, constituting the inlet of the expansion assembly, and the inlet of each of the following chambers is connected to the outlet for the regenerated solution of the chamber immediately upstream, the outlet for the regenerated solution of the expansion chamber most downstream of the regeneration column constituting the outlet of the expansion assembly, and the recompression assembly comprising a plurality of compressor stages of the type with conservation of the rate of flow pertaining to mass between fluid to be compressed and compressed fluid, each compressor stage being associated with an expansion chamber, said compressor stages being disposed in series so that each compressor stage has a suction orifice connected to the outlet for the vapor of the corresponding expansion chamber and a delivery orifice connected to the suction of the compressor stage corresponding to the expansion chamber located immediately upstream, the delivery orifice of the compressor stage associated with the expansion chamber connected to the bottom of the regeneration column being connected to the conduit of the regeneration column for supply of the compressed vapor comprising the outlet of the recompression assembly.

11. The installation of claim 10 further comprising n expansion chambers and n compressor stages associated therewith, n being a whole number ranging from 2 to 4.

12. The installation of claim 10 or 11 further comprising an absorption column so that the outlet for the expanded regenerated absorbent solution of the expansion chamber most downstream of the regeneration column is connected through a fluid circulation of an indirect heat exchanger, to one or more inlets of the absorption column and the outlet for the solution containing the absorbed gaseous compounds located at the bottom of the absorption column is connected, through a second fluid circulation circuit of said heat exchanger, to the conduit supply solution to be regenerated provided on the regeneration column.

* * * * *

UNITED STATES PATENT AND TRADEMARK OFFICE
CERTIFICATE OF CORRECTION

PATENT NO. : 4,384,875

DATED : May 24, 1983

INVENTOR(S) : Batteux et al.

It is certified that error appears in the above-identified patent and that said Letters Patent is hereby corrected as shown below:

The assignee should be --Societe Nationale Elf Aquitaine (Production)--

Column 3, line 59: change "injecting" to --injected--

Column 4, line 24: "at" should be deleted
    line 33: "vpaor" should be --vapor--

Column 5, line 52: "CO" should read --$CO_2$--

Column 6, line 3: "absorbant" should be --absorbent--

Column 7, lines 54-55: insert --is-- between "column" and "provided"

Column 8, line 53: change "on" to --are--

Column 11, line 15: change "1 or 4" to --one or more--
    line 30: insert --of the-- between "expansion" and "regenerated"

Column 14, line 26: change "supply" to --supplying--

Signed and Sealed this

Thirty-first Day of January 1984

[SEAL]

Attest:

GERALD J. MOSSINGHOFF

*Attesting Officer*  *Commissioner of Patents and Trademarks*